US008961817B2

(12) United States Patent
Toia et al.

(10) Patent No.: US 8,961,817 B2
(45) Date of Patent: Feb. 24, 2015

(54) GETTER DEVICES CONTAINING A COMBINATION OF GETTER MATERIALS

(71) Applicant: SAES Getters S.p.A., Lainate (IT)

(72) Inventors: Luca Toia, Carnago (IT); Marco Visconti, Desenzano del Garda (IT)

(73) Assignee: SAES Getters S.p.A., Lainate (MI) (IT)

( * ) Notice: Subject to any disclaimer, the term of this patent is extended or adjusted under 35 U.S.C. 154(b) by 0 days.

(21) Appl. No.: 14/349,280

(22) PCT Filed: Dec. 21, 2012

(86) PCT No.: PCT/IB2012/057585
§ 371 (c)(1),
(2) Date: Apr. 2, 2014

(87) PCT Pub. No.: WO2013/098734
PCT Pub. Date: Jul. 4, 2013

(65) Prior Publication Data
US 2014/0248452 A1    Sep. 4, 2014

(30) Foreign Application Priority Data

Dec. 27, 2011 (IT) .............................. MI2011A2387

(51) Int. Cl.
*B01J 20/06* (2006.01)
*B01J 20/04* (2006.01)
*B01J 20/26* (2006.01)
*E04B 1/76* (2006.01)
*H01K 1/56* (2006.01)
*B01J 20/32* (2006.01)
*H01J 7/18* (2006.01)
*B01J 20/02* (2006.01)
*B01J 20/28* (2006.01)

(52) U.S. Cl.
CPC  *B01J 20/26* (2013.01); *B01J 20/06* (2013.01); *B01J 20/3236* (2013.01); *H01J 7/183* (2013.01); *B01J 20/0207* (2013.01); *B01J 20/0222* (2013.01); *B01J 20/0225* (2013.01); *B01J 20/0229* (2013.01); *B01J 20/0237* (2013.01); *B01J 20/28026* (2013.01); *E04B 1/7604* (2013.01); *B01D 2253/1122* (2013.01); *B01D 2253/1124* (2013.01); *B01D 2253/25* (2013.01)
USPC ..................... 252/181.7; 252/181.6; 428/34.5; 428/34.7; 428/35.3; 502/304; 502/339; 502/318; 502/331; 502/333; 423/263; 423/247; 423/248

(58) Field of Classification Search
USPC ............ 252/181.6, 181.7; 502/304, 318, 331, 502/333, 339; 428/34.5, 34.7, 35.3; 423/247, 248, 263
See application file for complete search history.

(56) References Cited

U.S. PATENT DOCUMENTS

| 6,756,339 B1 * | 6/2004 | Rokicki et al. ................. 502/304 |
| 2003/0186805 A1 * | 10/2003 | Vanderspurt et al. ......... 502/304 |
| 2005/0207958 A1 | 9/2005 | Faur-Ghenciu et al. |
| 2006/0165853 A1 | 7/2006 | Ekanayake et al. |
| 2007/0259975 A1 * | 11/2007 | Lee et al. ....................... 518/715 |
| 2008/0272333 A1 * | 11/2008 | Blanco-Garcia et al. .. 252/181.6 |
| 2009/0274936 A1 * | 11/2009 | Goldstein et al. ............... 429/13 |
| 2010/0233046 A1 * | 9/2010 | Chigapov et al. ............. 422/177 |
| 2011/0207003 A1 | 8/2011 | Anfang et al. |
| 2013/0123100 A1 * | 5/2013 | Cheung et al. ................ 502/208 |
| 2013/0183221 A1 * | 7/2013 | Chen et al. .................... 423/247 |

FOREIGN PATENT DOCUMENTS

| EP | 0757920 | 2/1997 |
| WO | 94/18876 | 9/1994 |
| WO | 2006/064289 | 6/2006 |
| WO | 2007/013119 | 2/2007 |
| WO | 2007/069485 | 6/2007 |

OTHER PUBLICATIONS

Jung et al., Doping effect of precious metal on the activity of CuO—$Ce_2$ catalyst for selective oxidation of CO, Applied Catalysis A: General 2007, 331: 112-130.
Luo et al., One-step synthesis of nanostructured Pd-doped mixed $MO_x$—$CeO_2$ (M=Mn, Fe, Co, Ni, Cu) for efficient CO and $C_3H_8$ total oxidation, Applied Catalysis B: Environmental 2009, 89: 92-103.
PCT International Search Report mailed on Apr. 4, 2013 for PCT/IB2012/057585 filed on Dec. 21, 2012 in the name of SAES Getters S.p.A.
PCT Written Opinion mailed on Apr. 4, 2013 for PCT/IB2012/057585 filed on Dec. 21, 2012 in the name of SAES Getters S.p.A.
PCT International Preliminary Report on Patentability mailed on Feb. 10, 2014 for PCT/IB2012/057585 filed on Dec. 21, 2012 in the name of SAES Getters S.p.A.
Bickford, E., et al., Nano-structured $CeO_2$ supported Cu—Pd bimetallic catalysts for the oxygen-assisted water-gas-shift reaction, Catalysis Today 2005, 99: 347-357.

* cited by examiner

*Primary Examiner* — Joseph D Anthony
(74) *Attorney, Agent, or Firm* — Steinfl & Bruno, LLP

(57) ABSTRACT

A getter device containing a combination of getter materials is described. The device has a mixture of cerium oxide, copper oxide and metallic palladium for the removal of hydrogen and carbon monoxide in vacuum applications, particularly suitable to be used in vacuum insulation applications. This combination of getter materials is preferably added to powders of other getter materials such as alkali metals hydroxides and desiccant materials that are effective for maintaining the vacuum in thermal insulation systems.

7 Claims, No Drawings

GETTER DEVICES CONTAINING A COMBINATION OF GETTER MATERIALS

CROSS REFERENCE TO RELATED APPLICATIONS

The present application is the US national stage of International Patent Application PCT/IB2012/057585 filed on Dec. 21, 2012 which, in turn, claims priority to Italian Patent Application MI2011A002387 filed on Dec. 27, 2011.

The present invention relates to a new combination of getter materials and to sorbing devices that contain said combination. In particular, the present invention relates to a getter combination suitable to the maintenance of vacuum in devices which cannot be heated to temperatures above about 200° C., with particular reference to applications such as vacuum insulated panels or electronic packaging.

Getter materials have proved extremely advantageous or even essential in all industrial and commercial applications wherein the maintenance of vacuum is required.

In order to allow their effective and wider use, the sorbing properties of the getter materials have to be excellent as regards the removal of $O_2$, $N_2$ and $H_2O$, thus eliminating the main atmospheric gases from the gaseous mixture that is present within the volume in which the vacuum must be maintained.

However, the gaseous mixture inside of the walls that delimit the volume that has to be maintained evacuated depends largely on the degassing of the materials forming said walls as well as, in the case of evacuated panels, on the optionally present fillers that generally are in the form of powders, foams or wools, i.e. provided with high specific surface. For example, in the case of panel cavities containing polymeric fillers made of plastic material, the main degassing gases are CO and $CO_2$, whereas $H_2$ is mainly present for example when glass wool is used. The amount of these gases may be remarkable, especially in the case that heating phases are used in the production process of the interspace. This is the case for example of the production of refrigerators, wherein the insulating panels can reach temperatures close to 100° C. for periods of few minutes.

Published international patent application WO 94/18876 describes the use in combination of a noble metal oxide, in particular palladium oxide (PdO) and of a moisture sorbing material, such as barium oxide (BaO), for vacuum maintenance in evacuated interspaces of "dewars", "thermos", etc. The palladium oxide, however, by reaction with hydrogen, is transformed into metallic Pd which, assuming a finely divided form, has pyrophoric properties; consequently the use of this combination of materials is not recommended for safety reasons.

European patent EP 0757920, in the name of the applicant, describes that oxides of cobalt ($Co_3O_4$) and of copper (CuO) mixed with a desiccant compound have good sorbing properties towards hydrogen and carbon monoxide, CO, which is one of the main gases that are present in the thermally insulating interspaces made of plastic material that are optionally filled with a filler. However, the cobalt oxide poses particular problems from the toxicological point of view, being suspected of possible carcinogenic activity, so that the recent international regulations have strong limitations to its use and it is expected that definitive prohibition will be reached within a few years. This problem is particularly felt with regards to the use in large scale applications that, at the life end of the final product, have to be disposed.

Published international patent application WO 2006/064289, in the name of Johnson Matthey PLC, describes the use of compositions in which palladium is used in association with a single transition metal oxide selected from cobalt, copper, iron, nickel, cerium and silver oxides, optionally in association with a desiccant material. However those described combinations that do not involve the use of cobalt oxide have a reduced, however appreciable, sorbing capacity with respect to hydrogen, but have unsatisfactory sorbing properties with respect to carbon monoxide.

Object of the present invention is to provide an improved combination of getter materials requiring no thermal activation and having high sorbing capacity towards carbon monoxide, which does not use cobalt oxide on account of its high harmfulness.

Another object of the invention is to provide a sorbing device using said combination of getter materials.

According to the present invention these and other objects are achieved with a getter device including a combination of getter materials comprising a mixture of powders of transition metals oxides and metallic palladium, wherein the amount of said metallic palladium is in the range between 0.2 and 2% by weight, characterized in that said transition metals oxides comprises cerium oxide and copper oxide and in that copper oxide is present in a quantity in the range between 5 and 50%, preferably between 10 and 20%, wherein all concentrations by weight are expressed with respect to the total weight of said transition metal oxides.

In an embodiment of the invention, said mixture of powders of transition metal oxides consists of cerium oxide and copper oxide.

In the following description and in the claims, copper oxide means the compound CuO, wherein copper is present in oxidation state II, while cerium oxide means the compound $CeO_2$ wherein cerium is present in the oxidation state IV. In the following description the abbreviation MO are also used to indicate in general a combination of oxides of transition metals, and the abbreviation MO+Pd indicates the mixture of MO and metallic palladium. The term "getter device" means any device that is able to sorb gaseous species such as hydrogen, oxygen, carbon monoxide and moisture, without releasing other gaseous species, said device being able to work in a range temperature between −80 and 80° C.

The inventors have discovered that, surprisingly, the use of a mixture of cerium and copper oxide, when containing metallic palladium, allows satisfactory sorbing properties of gases such as hydrogen and carbon monoxide to be obtained compared to cases where only one of these oxides is used. This has been obtained according to the present invention only for combinations comprising copper oxide in amount lower than 50% but higher than 5% with respect to the total weight of the combination of oxides, more preferably between 10 and 20%.

Moreover, inventors have found that an important property of said mixture of oxides in order to improve the sorption capacity according the requirements of vacuum insulation applications consists in an appropriate selection of the surface area per weight. In fact, it has to be preferably selected in the range between 5 and 50 $m^2/g$. This range of surface area is very different to the commonly used of similar mixture of transition metal oxides in catalysis for automotive applications or fuel cells, as for example described in the US patent application published as US 2003/0186805. Anyway, the selected surface area allows the use of the composition of the present invention with a maintained sorption capacity towards carbon monoxide and an unexpected additional sorption capacity towards hydrogen for the application of interest of the present invention, where the "working temperatures" are extremely lower than the ones typically used in catalytic applications. During the preparation of the mixture of transition metal oxides, a precursor of metallic palladium is added in such an amount that the final mixture will contain not more than 2% by weight of Pd. Palladium can be co-precipitated with the mixture of transition metal oxides, by introducing it into the same solution in the form of a soluble salt, for example hydrated $Pd(NO_3)_2$. Alternatively, palladium may be deposited from a solution on the grains of the previously formed transition metal oxides. The combination of transition metal oxides is used in the powder form, with particle size lower than 500 μm and preferably comprised between 0.1 and 100 μm.

As above mentioned, the combination of transition metal oxides and palladium in accordance with the present invention leads to satisfactory sorbing properties towards hydrogen and carbon monoxide. However, the inventors have discovered that the reactivity and the sorbing capacity towards carbon monoxide can be increased, if the composition of the gas mixture that is to be sorbed so requires, by adding an amount of at least one alkali and/or alkaline earth metal hydroxide, preferably lithium or calcium hydroxide, to said combination of getter materials. In a preferred embodiment, the weight ratio of the total of said powders of at least one metal hydroxide with respect to the powders of the mixture of transition metal oxides and metallic palladium (MO+Pd) is comprised in the range from 20:1 to 1:1.

If $H_2O$ is present among the gaseous species to be removed, the combination of getter materials of the invention may comprise a moisture sorbing material, which is preferably selected in the group of those which, according to the art, fix water in an irreversible way through a chemical reaction. For example, the oxides of calcium, strontium, barium and phosphorous are suitable for the purposes of the invention. Particularly preferred is the use of calcium oxide. The moisture sorbing material is preferably employed in powder form having a particle size between about 0.1 and 20 μm. In order to avoid the problem of wet powders packing, a powder of an inert material, for example alumina, may be added to the moisture sorbing material.

Both when lithium hydroxide is used and when it is not present, the weight ratio between the powders of the mixture of transition metal oxides and metallic palladium MO+Pd and the moisture sorbing material can vary within wide limits, also depending on the type of intended use and in particular of the actual gas mixture to be removed. In general, however, the weight ratio between the MO+Pd mixture and the moisture sorbing material can vary between about 5:1 and 1:120, and preferably between 1:20 and 1:120.

Finally, in a further embodiment the above described compositions may be used in mixture with mirror amounts of manganese oxide MnO or iron oxide FeO, particularly useful if the gas mixture to be absorbed comprises oxygen. For the applications to which the present invention is intended, the amounts of MnO or FeO may vary between 0.5 and 20% by weight relative to the total of the combination of all the getter materials.

The combination of getter materials in the getter device of the invention is preferably used by arranging it inside a container made of a polymeric material permeable to the gases of the mixture to be removed, said permeability being a result of the porosity of the walls of said container, or to the permeability characteristic of the material of which they are constituted. With regard to form of said container, particularly preferred is the form of a bag heat-sealed along one or more of its sides. The polymeric material for this envelope can be selected from polyethylene in the form of non-woven fabric, LDPE, HDPE, EVA, SEBS.

In an alternative embodiment, extruded or granulated polymers may be produced by the commonly known techniques of this field, wherein the composition powders are dispersed. In this case, polymeric matrices such as LDPE, HDPE, PP, EVA, SEBS are particularly preferred.

The invention and its technical advantages over the prior art can be illustrated with reference to the following examples.

In a second aspect, the present invention consists in a Vacuum Insulation Panel comprising an internal volume confined between two walls further including a getter device containing a combination of getter materials comprising a mixture of powders of transition metals oxides and metallic palladium, wherein the amount of said metallic palladium is in the range between 0.2 and 2% by weight, characterized in that said mixture of powders of transition metals oxides comprises cerium oxide and copper oxide and in that copper oxide is present in a quantity in the range between 5 and 50%, preferably between 10 and 20%, wherein all concentrations by weight are expressed with respect to the total weight of said combination of transition metal oxides, said getter device being inserted in said internal volume or in a separated volume connected to said internal volume.

EXAMPLE 1

10% $CuO$—$CeO_2$/1% Pd 1.5 g of $Cu_2(CO_3)(OH)_2$ (malachite) were suspended in a 5M aqueous solution of $Ce(NO_3)_3.6H_2O$ (10 ml). Water was then evaporated thus impregnating the malachite. The obtained solid product was dried in an oven at 110° C., then it was again suspended in a 0.1 M aqueous solution of $Pd(NO_3)_2$ (10 ml). Water was again evaporated to obtain a brown powder. The obtained solid was decomposed in a muffle furnace at a temperature between 300 and 500° C. for 5 hours. The thus obtained product is herein defined as sample 1, having a surface area of 37 $m^2/g$ (BET measurement).

EXAMPLE 2

20% $CuO$—$CeO_2$/1% Pd 2.8 g of $Cu_2(CO_3)(OH)_2$ (malachite) were suspended in a 4.6M aqueous solution of $Ce(NO_3)_3.6H_2O$ (10 ml). Water was then evaporated thus impregnating the malachite. The obtained solid product was dried in an oven at 110° C., then it was again suspended in a 0.1 M aqueous solution of $Pd(NO_3)_2$ (10 ml). Water was again evaporated to obtain a brown powder. The obtained solid was decomposed in a muffle furnace at a temperature between 300 and 500° C. for 5 hours. The thus obtained product is herein defined as sample 2, having a surface area of 19 $m^2/g$ (B.E.T. measurement).

EXAMPLE 3

10% $CuO$—$CeO_2$/1% Pd and LiOH

10% $CuO$—$CeO_2$/Pd (prepared as described in Example 1) and LiOH in a 4:1 ratio were mechanically mixed for 1 h. The thus obtained product is here defined as sample 3.

EXAMPLE 4 (COMPARATIVE)

CuO/1% Pd 13.6 g of $Cu_2(CO_3)(OH)_2$ were suspended in a 0.1 M aqueous solution of $Pd(NO_3)_2$ (10 ml). Water was evaporated to obtain a brown powder. The obtained solid was decomposed in a muffle furnace at a temperature of 200° C. for 5 hours. The thus obtained product is defined herein as sample 4, having a surface area of 26 $m^2/g$ (B.E.T. measurement).

EXAMPLE 5 (COMPARATIVE)

$Co_3O_4$/1% Pd

A solution of $PdCl_2$ was added, under stirring, to a 2M aqueous solution of $Co(NO_3)_2.6H_2O$. After 5 min a 0.8 M aqueous solution of $NaHCO_3$ was added. Gas was released. After that the gas release had terminated, 35% $H_2O_2$ was added. Terminated the addition of $H_2O_2$, it was heated to 85° C. The obtained solid was recovered by filtration. $Co_3O_4$ was finally dried in an oven at 130° C. for 10 hours. The thus obtained product is defined herein as sample 5, having a surface area of 100 $m^2/g$ (B.E.T. measurement).

EXAMPLE 6

80% $CuO—CeO_2$/1% Pd 11.1 g of $Cu_2(CO_3)(OH)_2$ (malachite) were suspended in a 1.1M aqueous solution of $Ce(NO_3)_3.6H_2O$ (10 ml). Water was then evaporated thus impregnating the malachite. The obtained solid product was dried in an oven at 110° C., then it was again suspended in a 0.1 M aqueous solution of $Pd(NO_3)_2$ (10 ml). Water was again evaporated to obtain a green powder. The obtained solid was decomposed in a muffle furnace at a temperature between 300 and 500° C. for 5 hours. The thus obtained product is herein defined as sample 6, having a surface area of 12 $m^2/g$ (B.E.T. measurement).

EXAMPLE 7

10% $CuO—CeO_2$/0.1% Pd 1.4 g of $Cu_2(CO_3)(OH)_2$ (malachite) were suspended in a 5.2M aqueous solution of $Ce(NO_3)_3.6H_2O$ (10 ml). Water was then evaporated thus impregnating the malachite. The obtained solid product was dried in an oven at 110° C., then it was again suspended in a 0.01 M aqueous solution of $Pd(NO_3)_2$ (10 ml). Water was again evaporated to obtain a brown powder. The obtained solid was decomposed in a muffle furnace at a temperature between 300 and 500° C. for 5 hours. The thus obtained product is herein defined as sample 7, having a surface area of 26 $m^2/g$ (B.E.T. measurement).

The sorbing capacity of the samples of the previous examples was calculated through sorption tests towards hydrogen and carbon monoxide, by exposing each sample at a constant pressure of 5 torr (Ptest) of the test gas within a previously evacuated room, which was isolated from the outside and connected only to a dosing room through a valve V which was adjusted so as to maintain Ptest to the required value. The decrease in pressure inside the dosing room gives a measure of the sorbing capacity of the sample for the specific test gas.

When the getter removes $H_2$ or CO, Ptest decreases and, in order to bring its value to 5 torr, V is opened, thereby decreasing the pressure inside the dosing room.

The results, expressed as amount absorbed after different periods of time of exposure to the gas to be removed have been reported in Table 1, where it is evident that samples 1, 2 and 3 have excellent sorbing properties of both gases when compared with comparative sample 5 (in which the used transition oxide powders are of cobalt oxide) and with the comparative sample 4 (in which cerium oxide powders are not used but only copper oxide).

An high content of CuO (sample 6) or a low content of Pd (sample 7) in the combination of oxides MO+Pd have a negative effect in the sorbing properties of $H_2$. All sample have been tested at room temperature (RT).

Also an increase in the measurement temperature (sample 1 at 100° C.) has a negative effect in the sorbing properties of $H_2$.

TABLE 1

| Sample | Composition (wt/wt %) | | | | | $H_2$ Amount (torrl/g) | | | CO Amount (torrl/g) | | | Operating Temperature (° C.) |
| | CuO | $CeO_2$ | Pd | LiOH | $Co_3O_4$ | 20 hrs | 40 hrs | 100 hrs | 20 hrs | 40 hrs | 100 hrs | |
|---|---|---|---|---|---|---|---|---|---|---|---|---|
| 1 | 10 | 89 | 1 | — | — | 25 | 31 | 33 | 1.8 | 1.9 | 2.2 | RT |
|   | 10 | 89 | 1 | — | — | 0.3 | 0.3 | 0.3 | — | — | — | 100 |
| 2 | 20 | 79 | 1 | — | — | 32 | 43 | 45 | 1 | 1.2 | 1.2 | RT |
| 3 | 8 | 71 | 0.8 | 20 | — | — | — | — | 5 | 5 | 6 | RT |
| 4 | 99 | — | 1 | — | — | 0.3 | 0.5 | 0.5 | 0 | 0 | 0 | RT |
| 5 | — | — | 1 | — | 99 | 10 | 10 | 10 | 0 | 0 | 0 | RT |
| 6 | 80 | 19 | 1 | — | — | 0 | 0 | 0 | 0.5 | 1 | 2.5 | RT |
| 7 | 10 | 90 | 0.1 | — | — | 0.5 | 0.7 | 1 | 1.8 | 1.9 | 2.3 | RT |

The invention claimed is:

1. A getter device including a combination of getter materials comprising:
   a mixture of powders of transition metals oxides and metallic palladium, wherein
      an amount of said metallic palladium is in a range between 0.2 and 2% by weight with respect to a total weight of said transition metals oxides,
      said mixture of powders of transition metals oxides and metallic palladium have a surface area between 5 and 50 $m^2/g$ and comprise cerium oxide and copper oxide, and copper oxide is present in a quantity in the range between 5 and 50% with respect to the total weight of said transition metals oxides,
   wherein the combination of getter materials further comprises powders of at least one metal hydroxide selected in the group consisting of lithium hydroxide and calcium hydroxide.

2. The getter device according to claim 1, wherein the weight ratio of said powders of at least one metal hydroxide to said mixture of powders of transition metals oxides and metallic palladium is comprised between 20:1 and 1:1.

3. A getter device including a combination of getter materials comprising:
   a mixture of powders of transition metals oxides and metallic palladium, wherein
      an amount of said metallic palladium is in a range between 0.2 and 2% by weight with respect to a total weight of said transition metals oxides, said mixture of powders of transition metals oxides and metallic palladium have a surface area between 5 and 50 $m^2/q$ and comprise cerium oxide and copper oxide, and copper oxide is present in a quantity in the range between 5 and 50% with respect to the total weight of said transition metals oxides, wherein the combination of getter materials further comprises powders of a moisture sorbing material, the weight ratio of the mixture of powders of transition metals oxides and metallic palladium to said powders of moisture sorbing material being comprised between 5:1 and 1:120, preferably between 1:20 and 1:120.

4. A getter device including a combination of getter materials comprising:

a mixture of powders of transition metals oxides and metallic palladium, wherein an amount of said metallic palladium is in a range between 0.2 and 2% by weight with respect to a total weight of said transition metals oxides, said mixture of powders of transition metals oxides and metallic palladium have a surface area between 5 and 50 $m^2/q$ and comprise cerium oxide and copper oxide, and copper oxide is present in a quantity in the range between 5 and 50% with respect to the total weight of said transition metals oxides, wherein the combination of getter materials is enclosed in a polymeric container.

5. The getter device according to claim 4 wherein said container is in the form of a thermally sealed envelope.

6. A getter device including a combination of getter materials comprising:

a mixture of powders of transition metals oxides and metallic palladium, wherein an amount of said metallic palladium is in a range between 0.2 and 2% by weight with respect to a total weight of said transition metals oxides, said mixture of powders of transition metals oxides and metallic palladium have a surface area between 5 and 50 $m^2/q$ and comprise cerium oxide and copper oxide, and copper oxide is present in a quantity in the range between 5 and 50% with respect to the total weight of said transition metals oxides, wherein said combination of getter materials is dispersed within a polymeric matrix in the form of a composite or granulated polymer.

7. A vacuum insulation panel comprising an internal volume confined between two walls further including a getter device said getter device being inserted in said internal volume or in a separated volume connected to said internal volume, wherein the getter device includes a combination of getter materials comprising:

a mixture of powders of transition metals oxides and metallic palladium, wherein an amount of said metallic palladium is in a range between 0.2 and 2% by weight with respect to a total weight of said transition metals oxides, said mixture of powders of transition metals oxides and metallic palladium have a surface area between 5 and 50 $m^2/g$ and comprise cerium oxide and copper oxide, and copper oxide is present in a quantity in the range between 5 and 50% with respect to the total weight of said transition metals oxides.

\* \* \* \* \*